US010193880B1

(12) United States Patent
Jiang et al.

(10) Patent No.: US 10,193,880 B1
(45) Date of Patent: Jan. 29, 2019

(54) SYSTEMS AND METHODS FOR REGISTERING USER ACCOUNTS WITH MULTI-FACTOR AUTHENTICATION SCHEMES USED BY ONLINE SERVICES

(71) Applicant: Symantec Corporation, Mountain View, CA (US)

(72) Inventors: Kevin Jiang, Waltham, MA (US); Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 64 days.

(21) Appl. No.: 14/848,958

(22) Filed: Sep. 9, 2015

(51) Int. Cl.
*H04L 29/06* (2006.01)
*H04L 29/08* (2006.01)

(52) U.S. Cl.
CPC .......... *H04L 63/083* (2013.01); *H04L 63/105* (2013.01); *H04L 67/02* (2013.01)

(58) Field of Classification Search
CPC ... H04L 63/08; H04L 63/083; H04L 63/0838; H04L 63/0846; H04L 63/0853; H04L 63/105; H04L 67/02; H04L 63/0815
See application file for complete search history.

(56) References Cited

U.S. PATENT DOCUMENTS

| 8,627,438 | B1* | 1/2014 | Bhimanaik | H04L 63/10 726/9 |
| 9,363,262 | B1* | 6/2016 | Wilkes | H04L 63/083 |
| 2001/0037451 | A1* | 11/2001 | Bhagavatula | G06F 21/445 713/155 |
| 2008/0276098 | A1* | 11/2008 | Florencio | G06F 21/46 713/183 |
| 2008/0313707 | A1* | 12/2008 | Jain | H04L 63/08 726/2 |
| 2009/0249076 | A1* | 10/2009 | Reed | G06Q 30/00 713/181 |
| 2010/0107229 | A1* | 4/2010 | Najafi | G06F 21/35 726/6 |
| 2010/0132019 | A1* | 5/2010 | Hardt | H04L 63/08 726/6 |

(Continued)

OTHER PUBLICATIONS

"OpenID Explained" article dated Feb. 27, 2009 as verified by Internet Archive (4 pages) http://web.archive.org/web/20090227062242/http://openidexplained.com/.*
"How do I log in with OpenID?" article dated Mar. 10, 2009 as verified by Internet Archive (3 pages) http://web.archive.org/web/20090310044752/http://openidexplained.com:80/use.*

(Continued)

*Primary Examiner* — Joseph P Hirl
*Assistant Examiner* — Thomas A Gyorfi
(74) *Attorney, Agent, or Firm* — Fisher Broyles, LLP

(57) ABSTRACT

The disclosed computer-implemented method for registering user accounts with multi-factor authentication schemes used by online services may include (1) determining that a user is associated with an account with an online service that allows the user to register the account with an MFA scheme that requests the user to complete multiple authentication steps before being allowed to access the account, (2) identifying, based on an analysis of the online service, at least a portion of the information that is requested by the online service to register the account with the MFA scheme, and (3) providing the requested information to the online service such that the account is registered with the MFA scheme. Various other methods, systems, and computer-readable media are also disclosed.

18 Claims, 7 Drawing Sheets

(56) References Cited

U.S. PATENT DOCUMENTS

| | | | | |
|---|---|---|---|---|
| 2010/0162377 | A1* | 6/2010 | Gonzalez | G06F 21/31 726/9 |
| 2011/0047606 | A1* | 2/2011 | Blomquist | G06F 21/41 726/7 |
| 2012/0150669 | A1 | 6/2012 | Langley et al. | |
| 2012/0278241 | A1* | 11/2012 | Brown | G06F 21/32 705/67 |
| 2013/0185779 | A1* | 7/2013 | Tamai | G06F 21/36 726/6 |
| 2014/0157381 | A1* | 6/2014 | Disraeli | G06F 21/31 726/7 |
| 2015/0046989 | A1* | 2/2015 | Oberheide | G06F 21/44 726/6 |
| 2015/0172292 | A1* | 6/2015 | Kuang | H04L 63/0884 713/155 |
| 2015/0281222 | A1* | 10/2015 | Burch | H04L 63/0838 726/6 |
| 2015/0288701 | A1* | 10/2015 | Brand | H04L 63/102 726/7 |
| 2016/0004852 | A1* | 1/2016 | McEvoy | G06F 21/62 726/7 |
| 2016/0065579 | A1* | 3/2016 | Chen | G06F 21/45 726/4 |
| 2016/0337351 | A1* | 11/2016 | Spencer | H04L 63/0876 |
| 2016/0344735 | A1* | 11/2016 | Blinn | H04L 63/08 |
| 2017/0063857 | A1* | 3/2017 | Rykowski | H04L 63/10 |

OTHER PUBLICATIONS

Scott Schneider, et al; Systems and Methods for Enabling Biometric Authentication Options; U.S. Appl. No. 14/178,276, filed Feb. 12, 2014.

Ilya Sokolov, et al; Systems and Methods for Creating Credential Vaults That Use Multi-factor Authentication to Automatically Authenticate Users to Online Services; U.S. Appl. No. 14/754,737, filed Jun. 30, 2015.

M'Raihi, D. et al., "TOTP: Time-Based One-Time Password Algorithm", http://tools.ietf.org/html/rfc6238, as accessed Apr. 20, 2015, Request for Comments: 6238, (May 2011).

"Authy", https://www.authy.com/, as accessed Apr. 20, 2015, (Nov. 20, 2011).

"Norton", https://login.norton.com, as accessed Apr. 20, 2015, Symantec Corporation, (On or before Apr. 20, 2015).

"Time-based One-time Password Algorithm", https://en.wikipedia.org/wiki/Time-based_One-time_Password_Algorithm, as accessed Apr. 20, 2015, Wikipedia, (Jul. 18, 2010).

"Google Authenticator", https://support.google.com/accounts/answer/1066447?hl=en, as accessed Apr. 20, 2015, (May 26, 2013).

"LastPass", https://lastpass.com/, as accessed Jul. 24, 2015, (Apr. 14, 2003).

Gott, Amber "Introducing Auto-Password Changing with LastPass", https://blog.lastpass.com/2014/12/introducing-auto-password-changing-with.html/, as accessed Jul. 24, 2015, (Dec. 9, 2014).

"Multifactor authentication (MFA) definition", http://searchsecurity.techtarget.com/definition/multifactor-authentication-MFA, as accessed Jul. 24, 2015, TechTarget, (Apr. 14, 2011).

* cited by examiner

SYSTEMS AND METHODS FOR REGISTERING USER ACCOUNTS WITH MULTI-FACTOR AUTHENTICATION SCHEMES USED BY ONLINE SERVICES

BACKGROUND

To increase the security of personal information stored within online accounts, online services are increasingly choosing to offer or require that users complete Multi-Factor Authentication (MFA) schemes to access or sign into their accounts. MFA schemes may involve entering a traditional username and password combination in addition providing a One Time Password (OTP) (e.g., a cryptographic authentication code generated by an additional device owned by the user). By adding multiple layers of security, MFA schemes may decrease the probability that a malicious user or hacker can access a private account. However, many users may be unaware that online services that host their accounts offer MFA registration. In addition, some users may elect to not register their accounts with MFA schemes due to the often lengthy and/or inconvenient process of manually completing MFA registration forms.

Some traditional systems for managing users' passwords may attempt to facilitate connecting users with their online accounts by storing and providing authentication credentials to login pages of online services. However, these traditional systems may be unable to alert users when more secure MFA schemes are available within online services. In addition, such traditional systems may be unable to efficiently and/or accurately provide the several levels of authentication required for many MFA schemes. Therefore, the instant disclosure identifies and addresses a need for improved systems and methods for registering user accounts with online services that use MFA.

SUMMARY

As will be described in greater detail below, the instant disclosure describes various systems and methods for registering user accounts with online services that use MFA by determining that a user has created or is in the process of creating an account with an online service that supports an MFA scheme, notifying the user that the MFA scheme is available, and then automatically or semi-automatically providing information to the online service to register the user's account with the MFA scheme.

In one example, a computer-implemented method for registering user accounts with multi-factor authentication schemes used by online services may include (1) determining that a user is associated with an account with an online service that allows the user to register the account with an MFA scheme that requests the user to complete multiple authentication steps before being allowed to access the account, (2) identifying, based on an analysis of the online service, at least a portion of the information that is requested by the online service to register the account with the MFA scheme, and (3) providing the requested information to the online service such that the account is registered with the MFA scheme.

In some examples, determining that the user is associated with the account with the online service may include determining that the user is attempting to create a new account with the online service. In other examples, the method may include determining that (1) the user has an existing account with the online service and (2) the user has not yet registered the existing account with the MFA scheme. In these examples, the method may further include prompting the user to initiate an at least partially automatic process of providing the requested information to the online service to register the existing account with the MFA scheme.

In some embodiments, identifying the portion of the information that is requested by the online service may include searching a user interface of the online service for user input fields that request information from the user. Additionally or alternatively, the method may include identifying the online service and then searching a database that stores information about MFA schemes used by multiple online services for information that is known to be requested by the online service when users register accounts with the MFA scheme used by the online service.

In some examples, the portion of the information that is requested by the online service may include a username associated with the account, a password associated with the username, and/or personal identification information associated with the user. In these examples, providing the requested information to the online service may include locating the requested information within a credential vault that stores authentication information for multiple accounts associated with the user.

In some embodiments, the portion of the information that is requested by the online service may include a cryptographic authentication code generated by a token. The token may include a personal computing device owned by the user and/or a specially-configured application. In such embodiments, providing the requested information to the online service may include utilizing a virtual representation of the token to provide the cryptographic authentication code to the online service. Furthermore, in some examples, the method may include monitoring interactions between the online service and one or more additional users to generate an automated script that provides the requested information to the online service.

In one embodiment, a system for implementing the above-described method may include (1) a determination module that determines that a user is associated with an account with an online service that allows the user to register the account with an MFA scheme that requests the user to complete multiple authentication steps before being allowed to access the account, (2) an identification module that identifies, based on an analysis of the online service, at least a portion of the information that is requested by the online service to register the account with the MFA scheme, and (3) a providing module that provides the requested information to the online service such that the account is registered with the MFA scheme. In addition, the system may include at least one physical processor configured to execute the determination module, the identification module, and the providing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) determine that a user is associated with an account with an online service that allows the user to register the account with an MFA scheme that requests the user to complete multiple authentication steps before being allowed to access the account, (2) identify, based on an analysis of the online service, at least a portion of the information that is requested by the online service to register the account with the MFA scheme, and (3) provide the requested information to the online service such that the account is registered with the MFA scheme.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
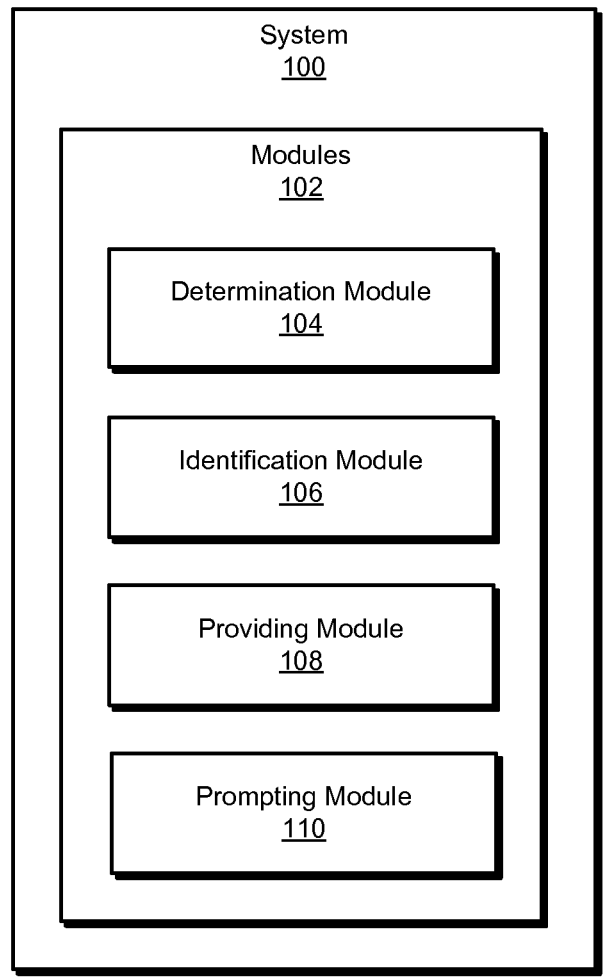
FIG. 1 is a block diagram of an exemplary system for registering user accounts with multi-factor authentication schemes used by online services.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for registering user accounts with multi-factor authentication schemes used by online services. As will be explained in greater detail below, by determining that a user has or is creating an online account for which an MFA scheme is available, the systems and methods described herein may notify the user that the MFA scheme is available and then provide authentication information to the online service that manages the account in order to register the account with the MFA scheme. As such, the disclosed systems and methods may increase the security of users' accounts by alerting users about MFA schemes they may be unaware of and by facilitating efficiently and/or automatically registering the accounts with the MFA schemes.

The following will provide, with reference to FIGS. 1, 2, 4, and 5, detailed descriptions of exemplary systems for registering user accounts with MFA schemes used by online services. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for registering user accounts with multi-factor authentication schemes used by online services. As illustrated in this figure, exemplary system 100 may include one or more modules 102 for performing one or more tasks. For example, and as will be explained in greater detail below, exemplary system 100 may include a determination module 104 that determines that a user is associated with an account with an online service that allows the user to register the account with an MFA scheme that requests the user to complete multiple authentication steps before being allowed to access the account. Exemplary system 100 may also include an identification module 106 that identifies, based on an analysis of the online service, at least a portion of the information that is requested by the online service to register the account with the MFA scheme.

In addition, and as will be described in greater detail below, exemplary system 100 may include a providing module 108 that provides the requested information to the online service such that the account is registered with the MFA scheme. Finally, exemplary system 100 may include a prompting module 110 that prompts the user to initiate an at least partially automatic process of providing the requested information to the online service to register the account with the MFA scheme. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Figure 2:
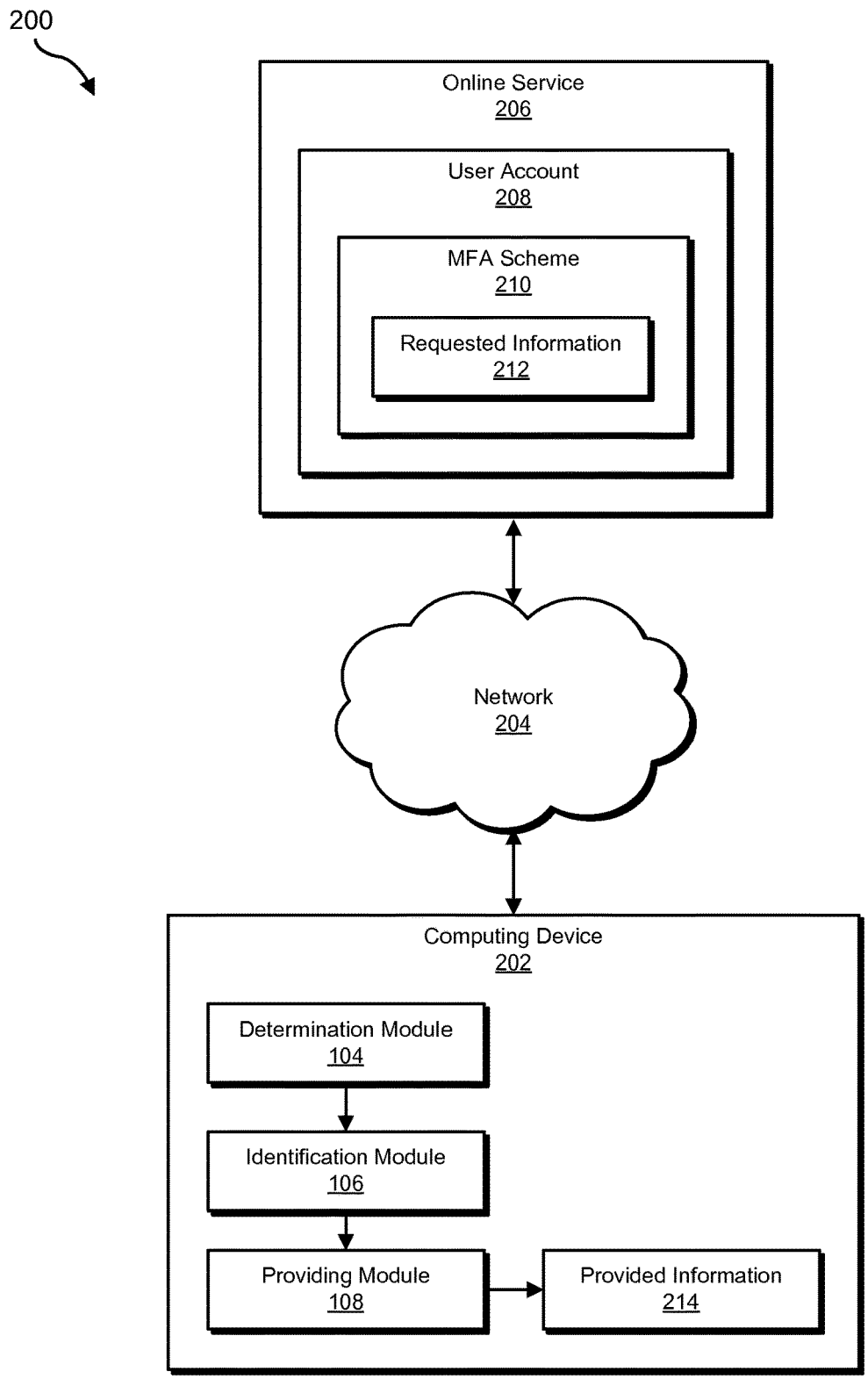
FIG. 2 is a block diagram of an additional exemplary system for registering user accounts with multi-factor authentication schemes used by online services.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with an online service 206 via a network 204. In one example, computing device 202 may be programmed with one or more of modules 102 in order to register a user account with an MFA scheme used by online service 206. As will be explained in greater detail below, in some embodiments, computing device 202 may operate as a back-end server that monitors online service 206 and/or interactions between users and online service 206. In these embodiments, one or more of modules 102 may be a part of and/or in communication with a browser extension running on a user's computing device. Computing device 202, via the browser extension running on the user's computing device, may facilitate registering an account owned by the user with an MFA scheme supported by online service 206.

In one embodiment, one or more of modules 102 from FIG. 1 may, when executed by at least one processor of computing device 202, enable computing device 202 to register user accounts with online services that use MFA. For example, and as will be described in greater detail below, determination module 104 may cause computing device 202 to determine that a user is associated with a user account 208 with online service 206 that allows the user to register user account 208 with an MFA scheme 210 that requests the user to complete multiple authentication steps before the user is allowed to access user account 208. Next, identification module 106 may cause computing device 202 to identify, based on an analysis of online service 206, at least a portion of requested information 212 that is requested by online service 206 to register user account 208 with MFA scheme 210. Finally, providing module 108 may cause computing device 202 to provide provided information 214 to online service 206 such that user account 208 is registered with MFA scheme 210.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between computing device 202 and online service 206.

Figure 3:
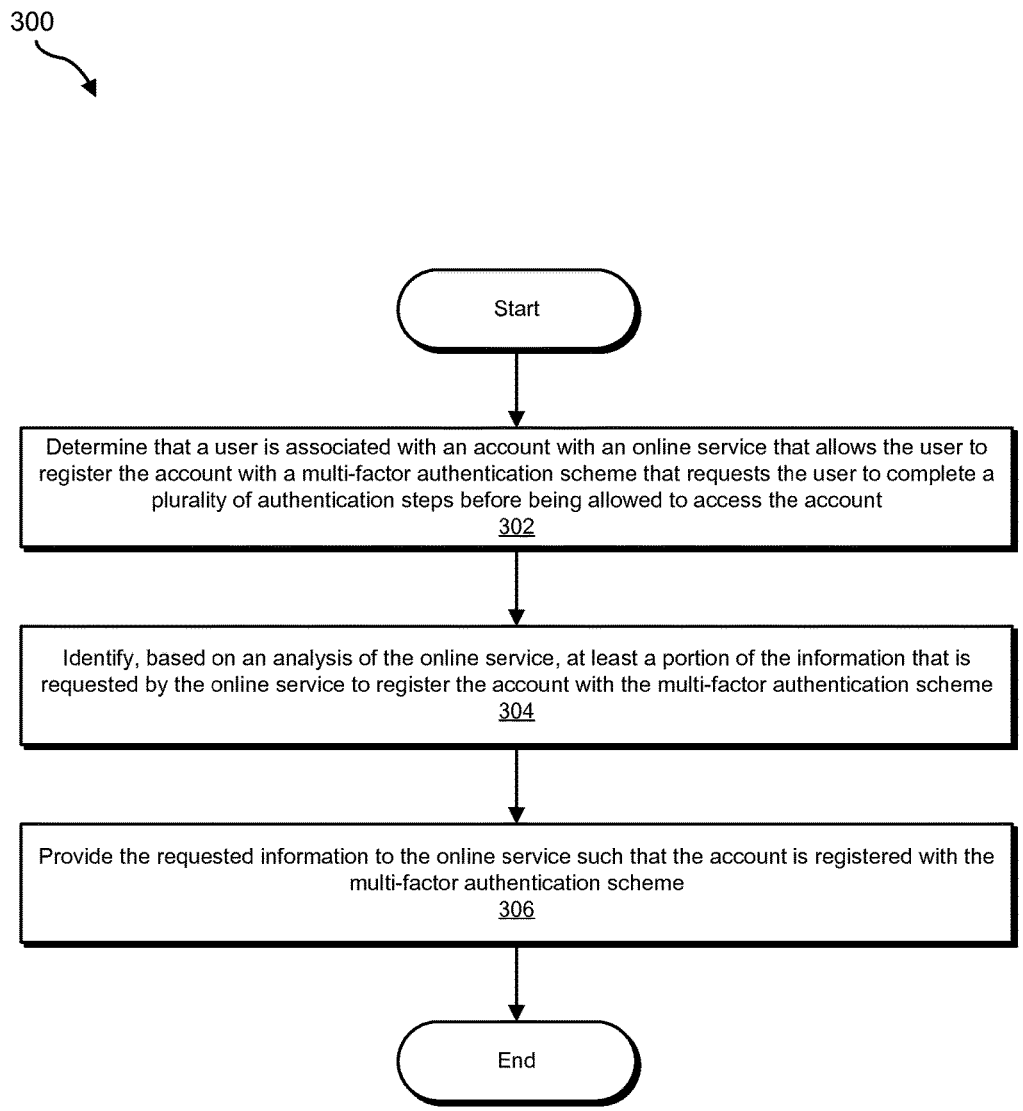
FIG. 3 is a flow diagram of an exemplary method for registering user accounts with multi-factor authentication schemes used by online services.

FIG. 3 is a flow diagram of an exemplary computer-implemented method 300 for registering user accounts with multi-factor authentication schemes used by online services. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may determine that a user is associated with an account with an online service that allows the user to register the account with an MFA scheme that requests the user to complete multiple authentication steps before being allowed to access the account. For example, determination module 104 may, as part of computing device 202 in FIG. 2, determine that a user is associated with user account 208 with online service 206 that allows the user to register user account 208 with MFA scheme 210.

The term "online service," as used herein, generally refers to any website and/or service that is provided via the Internet. Examples of an online service may include, without limitation, a social networking platform, an e-mail service, a chat service, a forum, a retail website, an online game, a financial website, and/or a docketing service. In some embodiments, an online service may enable users to create personal accounts within the online service that store private and/or sensitive information associated with the user.

The terms "account" and "user account," as used herein, generally refer to any representation of a user to one or more online services. In some embodiments, a user account may be protected by MFA to prevent unauthorized users from accessing the account. In some examples, an online service may request or require that a user register their account with an MFA scheme and then complete the MFA scheme each time the user attempts to access their account.

The term "multi-factor authentication," or, "MFA," as used herein, generally refers to any type of authentication process that requires more than one factor. In some examples, an MFA scheme may request a user to enter a traditional username and password and also one or more additional authentication credentials. In some embodiments, the additional authentication credentials may include personal identification information associated with a user, such as an address, phone number, or the answer to a security question (e.g., "What is your mother's maiden name?").

In other examples, the additional authentication credential may include a cryptographic authentication code generated by a token. The term "token," as used herein, generally refers to any device and/or application that can create and/or display a cryptographic authentication code. For example, an MFA process may require an email address, a password, and a code sent via text message to a mobile phone. In this example, the mobile device may be the token. In another example, an MFA process may require a username, a password, and a code generated by an RSA SECURID device. In this example, the RSA SECURID device may be the token. Additionally or alternatively, an MFA process may require a code generated by a specially designed application on a smartphone or other device. In this example, the application may be the token. Additional examples of a token may include, without limitation, VIP software tokens, AUTHY tokens, and/or GOOGLE AUTHENTICATOR tokens.

In some examples, registering an account with an MFA scheme may involve signaling to an online service that a user wishes to add the MFA scheme to the security procedures required to be completed each time the user wishes to access the account. In some embodiments, registering an account with an MFA scheme may involve completing one or more of the authentication steps included in the MFA scheme, such as providing personal identification information and/or providing a one-time authentication code (e.g., a cryptographic authentication code). Furthermore, in one example, a user may register an existing account with an MFA scheme (e.g., the user may upgrade the account's security measures from a single-factor authentication scheme to the MFA scheme). Alternatively, a user may create a new account and select to incorporate an MFA scheme into the security procedures associated with the account during the process of creating the account.

Figure 4:
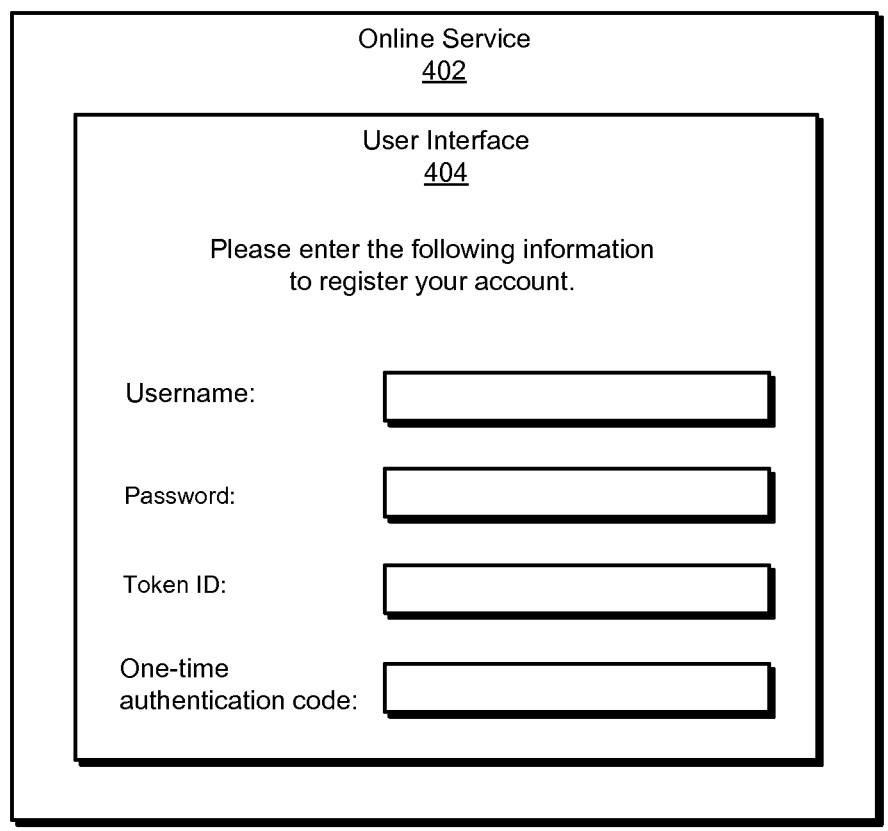
FIG. 4 is an illustration of an exemplary user interface of an online service that prompts a user to register an account with an MFA scheme.

As an example of an online service that offers MFA, FIG. 4 illustrates an online service 402 displaying a user interface 404 that contains an MFA registration form. In this example, user interface 404 may prompt a user to enter a username and password (similarly to traditional single-factor authentication schemes). In one example, the username and password may correspond to an existing user account. In another example, a user may enter a new username and password combination to create a new account. In addition, user interface 404 may prompt a user to enter a token ID that corresponds to a token capable of generating and/or receiving one-time authentication codes. User interface 404 may then prompt the user to enter a code generated or received by the token to complete registering the account with an MFA scheme. For example, online service 402 may prompt a user to enter a mobile phone number, send a code via a text message to the mobile phone, and prompt the user to enter the code received by the mobile phone.

The systems described herein may determine that a user is associated with an account with an available MFA scheme in a variety of ways. In some examples, determination module 104 may monitor and/or record multiple online accounts associated with a user to determine whether any of the user's existing accounts may be registered with an MFA scheme. For example, determination module 104 may determine that a user has an existing account with an online service but that the user has not yet registered the account with an MFA scheme supported by the online service. Specifically, determination module 104 may determine that the user is unaware that the MFA scheme is available and/or that the online service recently implemented the MFA scheme.

Determination module 104 may continuously and/or periodically monitor a variety of online services to detect when the online services implement MFA. For example, determination module 104 may query various online services about whether the online services have added or updated an MFA scheme. Additionally or alternatively, determination module 104 may direct various online services to send a notification indicating when they have implemented an MFA scheme. As such, the systems described herein may determine that MFA is available for a user's account even while the user is not logged into or attempting to log into the account.

In response to determining that a user has an account that is not yet registered with an available MFA scheme, the systems described herein may prompt the user to register their account with the MFA scheme in order to increase the security of the account. For example, prompting module 110 may display a dialog box, pop-up window, or other user interface that notifies the user about the available MFA scheme. The user interface may also prompt the user to initiate the process of providing registration information to the online service that implements the MFA scheme. As will be explained in greater detail below, the systems described herein described herein may perform the process of registering a user's account with an MFA scheme either automatically or semi-automatically (e.g., based on input from the user).

In some embodiments, determination module 104 may determine that a user is associated with an account with an available MFA scheme by determining that the user is attempting to create a new account with an online service that uses the MFA scheme. For example, determination module 104 may detect (e.g., by monitoring a user's online activities) that the user is currently viewing and/or filling out a registration form for an account that uses MFA (such as the registration form illustrated in FIG. 4). In this example, prompting module 110 may prompt the user to enable the systems described herein to automatically or semi-automatically complete the registration form.

Returning to FIG. 3, at step 304 one or more of the systems described herein may identify, based on an analysis of the online service, at least a portion of the information that is requested by the online service to register the account with the MFA scheme. For example, identification module 106 may, as part of computing device 202 in FIG. 2, identify, based on an analysis of online service 206, at least a portion of requested information 212.

The systems described herein may identify information that is requested by an online service to register an account with an MFA scheme in a variety of ways. In some examples, identification module 106 may identify a category, type, or label of each piece of information that is required to register an account with an MFA scheme. For example, identification module 106 may identify what kind of information a user is prompted to enter into each user input field within an MFA registration form. Referring to the example of FIG. 4, identification module 106 may determine that user interface 404 contains four user input fields that request a username, a password, a token ID, and a one-time authentication code.

In some embodiments, identification module 106 may identify the types of information requested by an MFA registration form by directly analyzing a user interface that contains the MFA registration form. For example, when a user is attempting to register an account with an MFA scheme, identification module 106 may analyze a user interface presented to the user that contains an MFA registration form. In one embodiment, identification module 106 may compare content of the user interface to signatures describing certain types of user input fields to determine locations of the MFA registration form that request certain types of information from the user.

In some examples, identification module 106 may monitor the activity of multiple users in order to accumulate knowledge of information requested by multiple online services when users register for MFA schemes supported by the online services. For example, identification module 106 may track browsing history, mouse movements, and/or keyboard inputs of one or more users to create templates for multiple online services that describe the information requested by MFA registration forms of the online services. The templates may indicate the locations of user input fields within MFA registration forms, various security questions that may be used by an online service, rules or restrictions for text entered into MFA registration forms (e.g., character requirements for passwords), information about tokens used to generate cryptographic authentication codes for MFA schemes, and/or any additional information that may be useful and/or necessary to complete an MFA registration form.

In the event that determination module 104 determines that a user is associated with an account with an available MFA scheme, identification module 106 may identify a template associated with the online service that hosts the account to identify information that is requested by the online service to register the user's account with the MFA scheme. In this way, the systems described herein may quickly and accurately complete MFA registration forms when users register their accounts with MFA schemes.

Returning to FIG. 3, at step 306 one or more of the systems described herein may provide the requested information to the online service such that the account is registered with the MFA scheme. For example, providing module 108 may, as part of computing device 202 in FIG. 2, provide provided information 214 to online service 206 such that user account 208 is registered with MFA scheme 210.

The systems described herein may provide an online service with information used to register an account with an MFA scheme in a variety of ways. In some examples, providing module 108 may identify and/or generate information to register a user with an MFA scheme supported by an online service after identification module 106 identifies the types of information that the online service requests and/or after the user provides input to initiate the process of providing the information. For example, after identification module 106 identifies what types of information are requested by user input fields within an MFA registration form that a user wishes to complete, providing module 108 may search one or more databases (such as a credential vault) to identify corresponding information associated with the user.

The term "credential vault," as used herein, generally refers to any service and/or storage medium capable of storing credentials for one or more online services. In some embodiments, a credential vault may store information such as usernames of a user's accounts, passwords of the user's accounts, answers to security questions that the user has previously answered, and/or additional personal identification information of the user (such as a phone number, email address, physical address, etc.). In these examples, modules 102 may include and/or access a credential vault that functions as an account manager for the user. Accordingly, providing module 108 may search the user's credential vault to identify existing authentication credentials (e.g., a username and password) of an account that is being registered with an MFA scheme, as well as any additional information associated with the user that may be requested by a registration form for the MFA scheme.

Additionally or alternatively, modules 102 may include and/or manage credential vaults that store virtual representations of tokens used to generate cryptographic authentication codes. U.S. patent application Ser. No. 14/754,737, titled Systems and Methods for Creating Credential Vaults that Use Multi-factor Authentication to Automatically Authenticate Users to Online Services and filed on 30 Jun. 2015, the disclosure of which is incorporated in its entirety by this reference, describes systems and methods for associating virtual representations of tokens with sets of credentials and user accounts in order to automatically authenticate users to multiple online services via a single sign-on process.

In some examples, the systems described herein may incorporate all or a portion of the features described in application Ser. No. 14/754,737 to automatically or semi-automatically register users with accounts that include cryptographic authentication codes as part of MFA schemes. For example, the systems described herein may create a virtual representation of one or more tokens (e.g., mobile devices, RSA SECURID devices, and/or specifically configured software applications) that may be used to generate cryptographic authentication codes and store the virtual representations within a credential vault. In the event that the systems described herein are registering a user with an MFA scheme of an online service that uses cryptographic authentication codes, providing module 108 may utilize a virtual representation of a token to automatically or semi-automatically provide an appropriate cryptographic authentication code to the online service.

As previously mentioned, the systems described herein may automatically or semi-automatically register users' accounts with MFA schemes. For example, prompting module 110 may provide a user interface to a user that directs the user to select an automatic or semi-automatic process of registering the user's account with an MFA scheme (either now or at a more convenient time for the user). In the event that a user selects to register their account automatically, providing module 108 may provide all of the required information to the online service without requiring additional input from the user. For example, providing module 108 may provide the requested information without re-directing the user to the online service, without prompting the user to provide additional input, and/or without displaying any additional user interface. In this way, the systems described herein may efficiently and seamlessly upgrade the security of users' online accounts while incurring minimal inconvenience to the user.

However, in some examples, users may wish to take a more active role in registering their accounts with MFA schemes. For example, users may wish to verify the accuracy of information provided to online services and/or prevent certain personal information from being shared with online services. In the event that a user selects to register their account semi-automatically, providing module 108 may display each piece of information that is to be provided to an online service to the user and direct the user to approve or deny providing the information to the online service. For example, providing module 108 may populate an MFA registration form and/or an additional user interface with requested information and prompt the user to accept or change the populated fields. Providing module 108 may prompt the user to accept or change each provided piece of information individually (e.g., in succession) or cumulatively (e.g., after an entire MFA registration form is populated). By offering such semi-automatic processes of registering user accounts with MFA schemes, the systems described herein may reduce the burden on users to manually identify and complete MFA registration forms, while retaining the users' control over information provided to online services.

Providing module 108 may use any of a variety of techniques to provide information to an online service. In one example, providing module 108 may utilize an automated script that mimics a user completing an MFA registration form. For example, as previously mentioned, identification module 106 may track mouse movements and/or keyboard inputs of users (e.g., either real or simulated users) as the users complete MFA registration forms. Providing module 108 may use this information to generate a script that can automatically and accurately populate user input fields within MFA registration forms. In addition to or instead of using an automated script, providing module 108 may provide requested information to online services by directly communicating with a database or server that hosts the online service, interfacing with the online service via an application program interface, and/or in any suitable manner.

Figure 5:
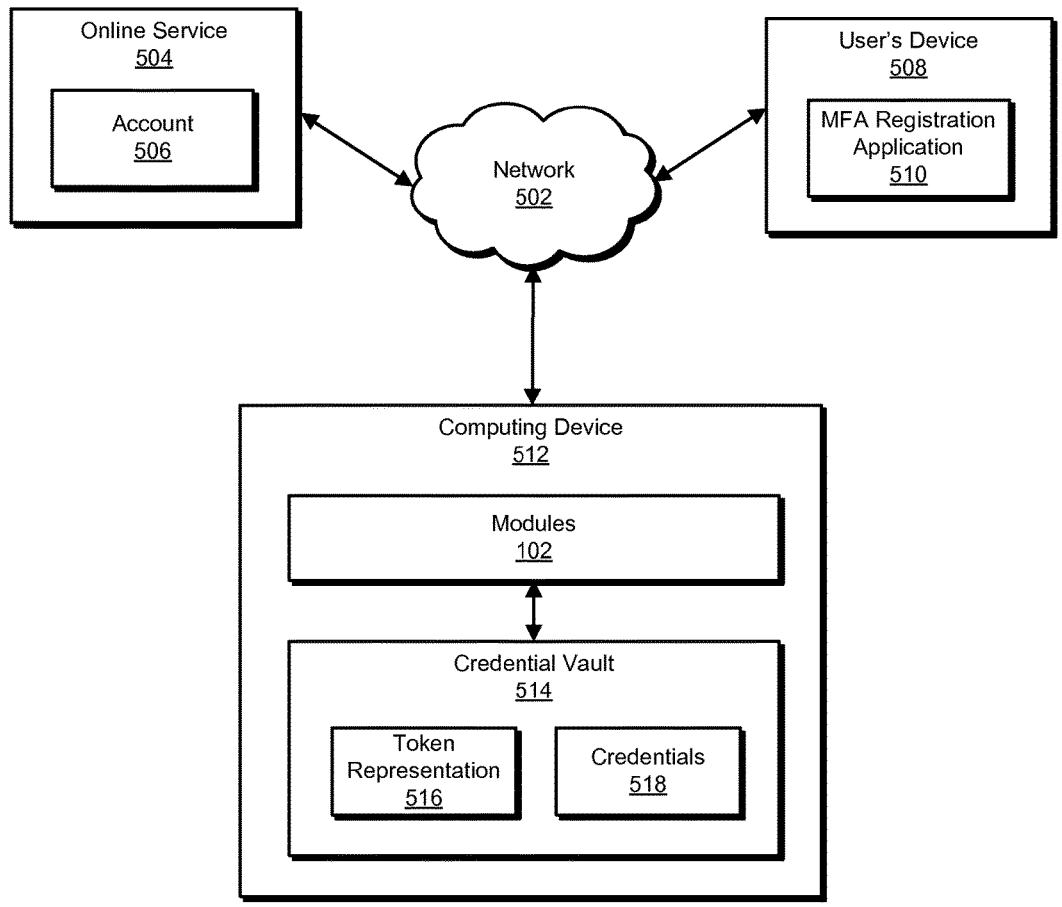
FIG. 5 is a block diagram of an additional exemplary system for registering user accounts with MFA schemes used by online services.

As previously mentioned, one or more of modules 102 may operate as part of and/or in conjunction with a browser extension that facilitates registering user accounts with MFA schemes. FIG. 5 illustrates an exemplary embodiment of such a configuration. In the example of FIG. 5, modules 102 may reside on a computing device 512 that is in communication with both a user's device 508 that runs an MFA registration application 510 (e.g., within a browser installed on user's device 508) and an online service 504 that hosts an account 506. In this example, modules 102 may interact with online service 504 via MFA registration application 510 and/or a network 502.

In some embodiments, MFA registration application 510 may manage a credential vault that stores authentication information associated with multiple accounts owned by a user. For example, MFA registration application 510 may be in communication with a credential vault 514 stored on computing device 512. In some examples, credential vault 514 may store credentials 518 that include usernames, passwords, personal identification information and/or answers to security questions associated with the user and the user's online accounts. In addition, credential vault 514 may store a token representation 516 that represents a virtualized version of a token used to generate cryptographic authentication codes.

In one embodiment, determination module 104 may determine that the user of user's device 508 is the owner of account 506. In addition, determination module 104 may determine that online service 504 has recently made an MFA scheme available for account 506 and that the user has not yet registered account 506 with the MFA scheme. In response, prompting module 110 may display, on user's device 508, a user interface that prompts the user to initiate an automatic or semi-automatic process of registering account 506 with the MFA scheme. In one embodiment, prompting module 110 may determine that the user has selected to automatically register account 506 with the MFA scheme. In response, identification module 106 may identify types of information requested by online service 504 to register account 506 with the MFA scheme. For example, identification module 106 may identify a previously-created template associated with online service 504 that indicates online service 504 requests a username, a password, and a one-time authentication code sent to a mobile device of a user to register accounts with the MFA scheme.

After determining the types of information that are requested by online service 504, providing module 108 may search credential vault 514 for corresponding information associated with the user and/or account 506. For example, providing module 108 may identify, within credentials 518, a username and password of account 506. In addition, providing module 108 may determine that token representation 516 represents a virtual version of the user's mobile device that is capable of generating cryptographic authentication codes requested by online service 504. As such, providing module 108 may use token representation 516 to generate an appropriate one-time authentication code for online service 504. After identifying the username and password and generating the authentication code, providing module 108 may provide this information (via, e.g., MFA registration application 510) to online service 504. In some examples, providing this information to online service 504 may successfully register account 506 with the MFA scheme used by online service 504.

Furthermore, in some examples, the systems described herein may facilitate authenticating users to online services that use MFA schemes after the users' accounts are registered with the MFA schemes. For example, determination module 104 may determine that a user is attempting to access and/or log into an existing account that has already been registered with an MFA scheme. In response, the systems described herein may identify information that is requested for the user to complete the MFA scheme. For example, identification module 106 may determine that the user is requested to provide a username and password associated with an existing account, an answer to a previously-selected security question, and a one-time authentication code. In response, providing module 108 may search a credential vault associated with the user for corresponding information and then automatically or semi-automatically provide the information to the online service that hosts the account. As a result of providing such information, the MFA scheme may be completed and the user may be authenticated to the online service.

As explained above in connection with method 300, the systems described herein may register user accounts with MFA schemes used by online services. For example, the systems described herein may determine that a user has or is creating an online account that uses an MFA scheme for which the user has not yet registered. In response, the systems described herein may prompt the user to initiate an automatic or semi-automatic process of registering the account with the MFA scheme in order to decrease the risk of an unauthorized user accessing the account. In response to receiving input from the user, the systems described herein may determine what information (e.g., a username, password, cryptographic authentication code, etc.) is requested by the online service to register the account with the MFA scheme and then identify and/or generate the requested information (e.g., utilizing a credential vault associated with the user). Finally, the systems described herein may provide the requested information to the online account such that the user's account is registered with the MFA scheme.

Figure 6:
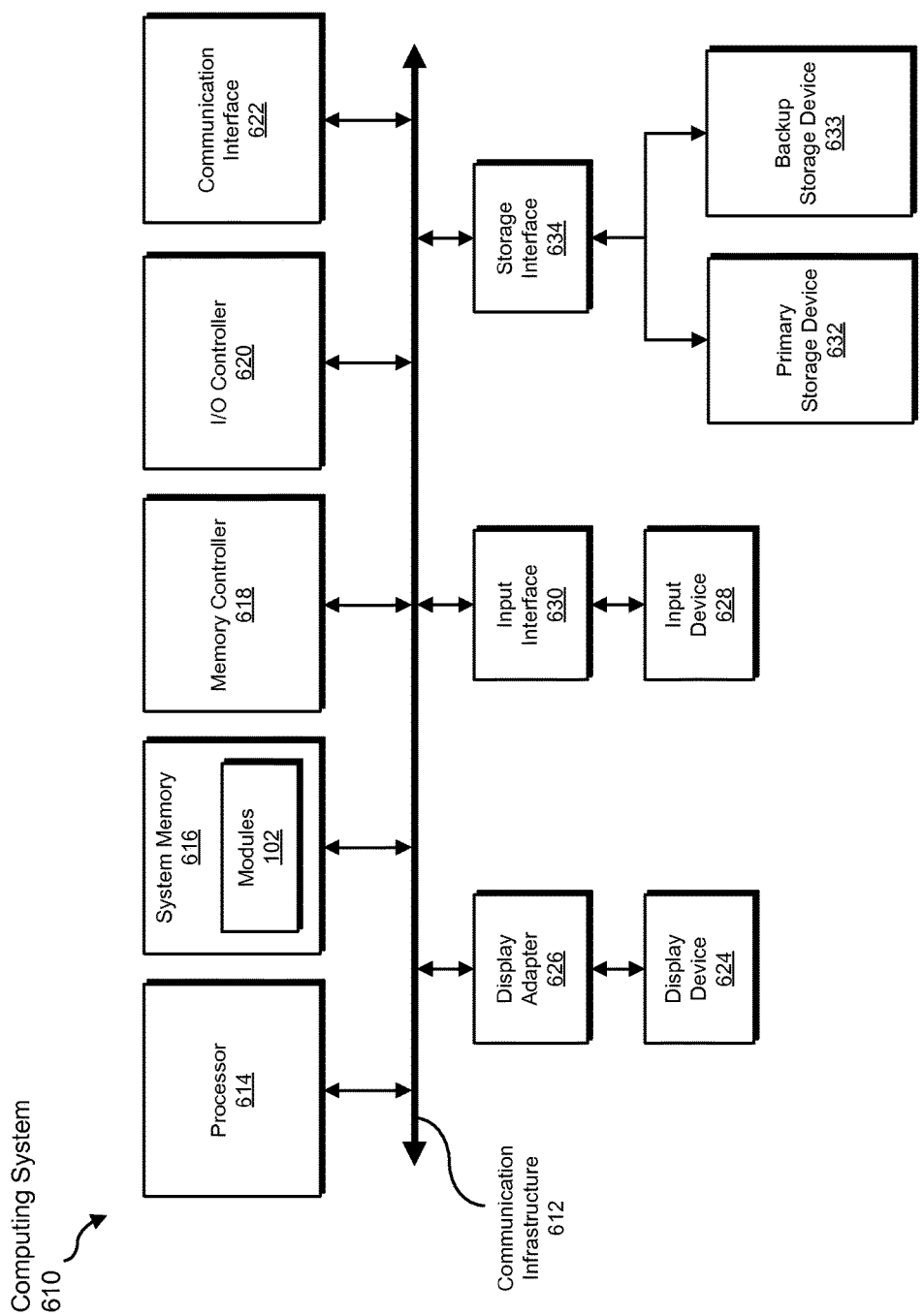
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
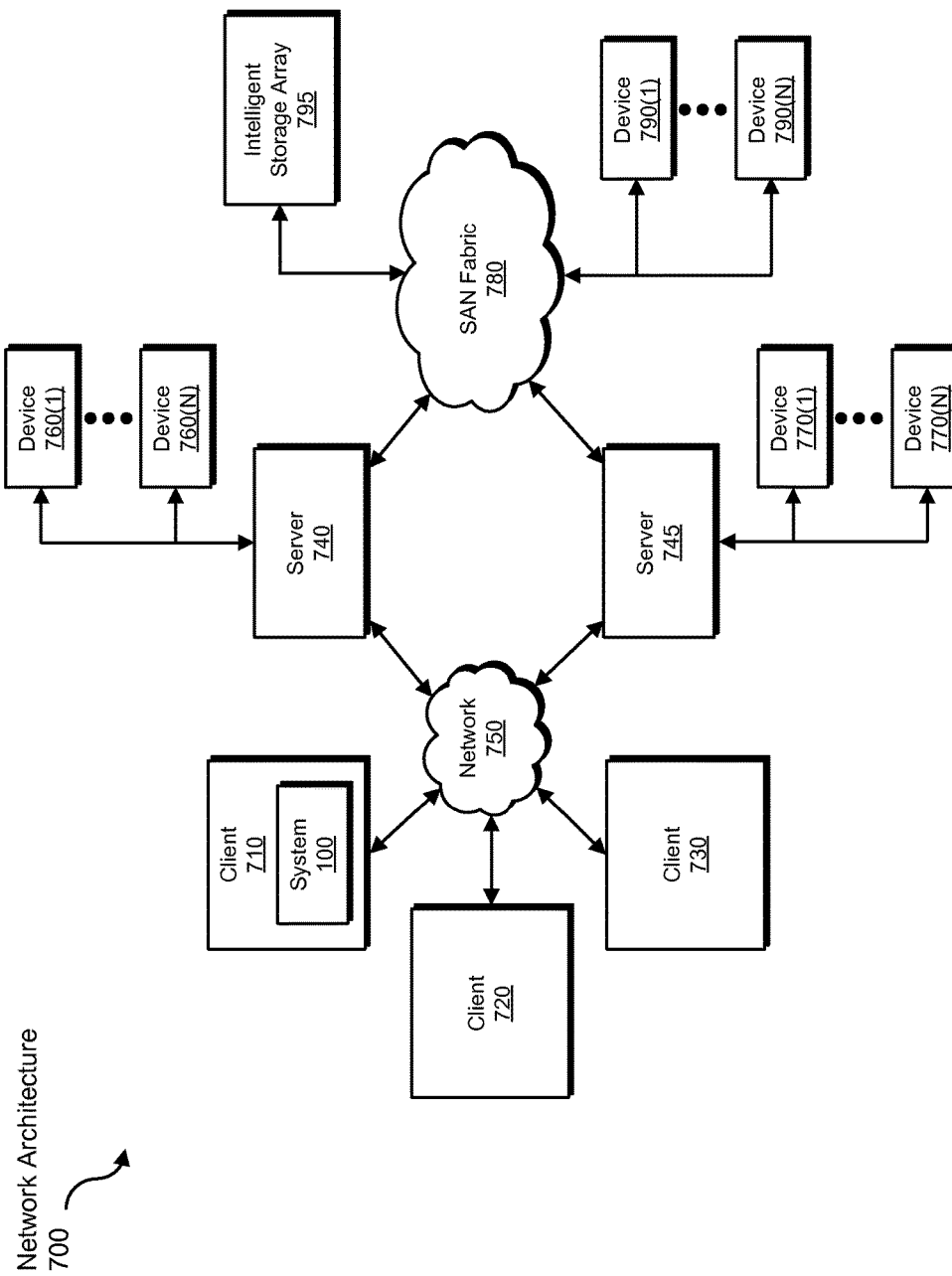
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for registering user accounts with multi-factor authentication schemes used by online services.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a user account that is not yet registered for an MFA scheme, transform the user account into a user account that is registered for the MFA scheme, output a result of the transformation to a user of the user account, use the result of the transformation to increase the security of the user account, and store the result of the transformation to an account management system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for registering user accounts with multi-factor authentication schemes used by online services, at least a portion of the method being performed by a computing device comprising at least one processor, the method comprising:
   determining, on a client device of a user, that the user is attempting to:
      create an account managed by an online service; and
      while creating the account, register the account with a multi-factor authentication scheme that requests the user to complete a plurality of authentication steps before being allowed to access the account;
   determining, on the client device of the user, based on an analysis of the online service, that the online service requests at least an item of personal identification information associated with the user to register the account with the multi-factor authentication scheme;
   identifying the item of personal identification information associated with the user by:
      accessing a credential vault stored on the client device that contains authentication information the user has previously provided to additional online services while registering additional accounts; and
      determining, based on the authentication information stored within the credential vault, that the user has previously provided the item of personal identification information to an additional online service while registering an additional account but has not provided the item of personal identification information to the online service; and
   registering the account with the multi-factor authentication scheme by providing, from the client device of the user to the online service, at least the item of personal identification information associated with the user.

2. The method of claim 1, further comprising determining that:
   the user has an existing account with an additional online service; and
   the user has not yet registered the existing account with an additional multi-factor authentication scheme provided by the additional online service.

3. The method of claim 2, further comprising prompting the user to initiate an at least partially automatic process of providing an additional item of personal identification information to the additional online service to register the existing account with the additional multi-factor authentication scheme.

4. The method of claim 1, wherein determining that the online service requests the item of personal identification information associated with the user comprises searching a user interface of the online service for user input fields that request information from the user.

5. The method of claim 1, wherein determining that the online service requests the item of personal identification information associated with the user comprises:
   identifying the online service; and
   searching a database that stores information about multi-factor authentication schemes used by a plurality of online services for information that is known to be requested by the online service when users register accounts with the multi-factor authentication scheme used by the online service.

6. The method of claim 1, wherein the item of personal identification information associated with the user comprises at least one of:
   an address of the user;
   a phone number of the user; and
   an answer to a security question.

7. The method of claim 1, wherein the credential vault is maintained by a browser extension running on the client device of the user.

8. The method of claim 1, further comprising:
   determining that the online service requests a cryptographic authentication code generated by a token to register the account with the multi-factor authentication scheme; and
   utilizing a virtual representation of the token to provide the cryptographic authentication code to the online service.

9. The method of claim 1, wherein providing, to the online service, the item of personal identification information associated with the user comprises monitoring interactions between the online service and at least one additional user to generate an automated script that provides the item of personal identification information to the online service.

10. A system for authenticating users to online services that use multi-factor authentication, the system comprising:
    a determination module, stored in memory, that determines, on a client device of a user, that the user is attempting to:
       create an account managed by an online service; and
       while creating the account, register the account with a multi-factor authentication scheme that requests the user to complete a plurality of authentication steps before being allowed to access the account;
    an identification module, stored in memory, that determines, on the client device of the user, based on an analysis of the online service, that the online service requests at least an item of personal identification information associated with the user to register the account with the multi-factor authentication scheme;
    a providing module, stored in memory, that:
       identifies the item of personal identification information associated with the user by:
          accessing a credential vault stored on the client device that contains authentication information the user has previously provided to additional online services while registering additional accounts; and
          determining, based on the authentication information stored within the credential vault, that the user has previously provided the item of personal identification information to an additional online service while registering an additional account; and
       registers the account with the multi-factor authentication scheme by providing, from the client device of the user to the online service, at least the item of personal identification information associated with the user but has not provided the item of personal identification information to the online service; and
    at least one physical processor configured to execute the determination module, the identification module, and the providing module.

11. The system of claim 10, wherein the determination module further determines that:
    the user has an existing account with an additional online service; and the user has not yet registered the existing account with an additional multi-factor authentication scheme provided by the additional online service.

12. The system of claim 11, further comprising a prompting module that prompts the user to initiate an at least partially automatic process of providing an additional item of personal identification information to the additional online service to register the existing account with the additional multi-factor authentication scheme.

13. The system of claim 10, wherein the identification module determines that the online service requests the item of personal identification information associated with the user by searching a user interface of the online service for user input fields that request information from the user.

14. The system of claim 10, wherein the identification module determines that the online service requests the item of personal identification information associated with the user by:
   identifying the online service; and
   searching a database that stores information about multi-factor authentication schemes used by a plurality of online services for information that is known to be requested by the online service when users register accounts with the multi-factor authentication scheme used by the online service.

15. The system of claim 10, wherein the item of personal identification information comprises at least one of:
   an address of the user;
   a phone number of the user; and
   an answer to a security question.

16. The system of claim 10, wherein the providing module maintains the credential vault within a browser extension running on the client device of the user.

17. A non-transitory computer-readable medium comprising one or more computer-readable instructions that, when executed by at least one processor of a computing device, cause the computing device to:
   determine, on a client device of a user, that the user is attempting to:
      create an account managed by an online service; and
      while creating the account, register the account with a multi-factor authentication scheme that requests the user to complete a plurality of authentication steps before being allowed to access the account;
   determine, on the client device of the user, based on an analysis of the online service, that the online service requests at least an item of personal identification information associated with the user to register the account with the multi-factor authentication scheme;
   identify the item of personal identification information associated with the user by:
      accessing a credential vault stored on the client device that contains authentication information the user has previously provided to additional online services while registering additional accounts; and
      determining, based on the authentication information stored within the credential vault, that the user has previously provided the item of personal identification information to an additional online service while registering an additional account but has not provided the item of personal identification information to the online service; and
   register the account with the multi-factor authentication scheme by providing, from the client device of the user to the online service, at least the item of personal identification information associated with the user.

18. The method of claim 3, wherein prompting the user to initiate the at least partially automatic process of providing the additional item of personal identification information to the additional online service to register the existing account with the additional multi-factor authentication scheme comprises:
   determining that the additional online service has recently made the additional multi-factor authentication scheme available for the existing account; and
   alerting the user that the additional multi-factor authentication scheme has become available.

* * * * *